US012641063B2

(12) United States Patent
Suriyanarayanan et al.

(10) Patent No.: US 12,641,063 B2
(45) Date of Patent: May 26, 2026

(54) SYSTEM AND METHOD FOR DYNAMICALLY ENCRYPTING NETWORK-BASED INTERACTIONS BASED ON EVALUATED INFRASTRUCTURE SECURITY

(71) Applicant: BANK OF AMERICA CORPORATION, Charlotte, NC (US)

(72) Inventors: Gowri Sundar Suriyanarayanan, Chennai (IN); Saurabh Arora, Gurugram (IN); Sandeep Kumar Chauhan, Hyderabad (IN); Maneesh Sethia, Hyderabad (IN); Shailendra Singh, Thane West (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 135 days.

(21) Appl. No.: 18/414,816

(22) Filed: Jan. 17, 2024

(65) Prior Publication Data
US 2025/0233850 A1      Jul. 17, 2025

(51) Int. Cl.
*H04L 9/40*      (2022.01)
*H04L 41/16*      (2022.01)

(52) U.S. Cl.
CPC .......... *H04L 63/0428* (2013.01); *H04L 41/16* (2013.01)

(58) Field of Classification Search
CPC ..... H04L 63/205; H04L 9/088; H04L 9/0894; H04L 9/0618; H04L 63/105; H04L 47/805; H04L 47/765; H04L 63/0846; H04L 63/06; H04L 63/0838; H04L 63/08;

H04L 9/0825; H04L 9/0877; H04L 9/0822; H04L 9/0891; H04L 9/083; H04L 9/0897; H04L 9/3271; H04L 67/14; H04L 65/1069;

(Continued)

(56) References Cited

U.S. PATENT DOCUMENTS

| 7,568,615 B2 | 8/2009 | Corona et al. |
| 9,569,771 B2 | 2/2017 | Lesavich et al. |

(Continued)

FOREIGN PATENT DOCUMENTS

WO      WO-2016173750 A1 *  11/2016  ........... H04L 63/205

*Primary Examiner* — Kyung H Shin
(74) *Attorney, Agent, or Firm* — Moore & Van Allen PLLC; Nicholas C. Russell

(57) ABSTRACT

Systems, computer program products, and methods are described herein for dynamically encrypting network-based interactions based on evaluated infrastructure security. The present disclosure is configured to evaluate a set of infrastructure security within a network-based interaction. The system includes evaluating a set of infrastructure security within a network-based interaction. The set of infrastructure security for the network-based interaction may comprise at least one node and a layer of security protocols. The system may further include assessing the set of infrastructure security for the network-based interaction, wherein the set of infrastructure security is assessed on a set of predetermined criteria. The system may include encrypting the network-based interaction based on assessment of the infrastructure security for the network-based interaction, with encryption complexity correlating to assessment of the set of infrastructure security for the network-based interaction.

17 Claims, 6 Drawing Sheets

(58) Field of Classification Search
CPC . H04L 65/1095; H04L 63/0428; H04L 41/16; G06F 21/606; G06F 16/972; G06F 21/602; G06Q 10/06316; G06Q 10/063114; G06N 3/08; G06N 20/00; H04W 28/0268; H04W 24/08; H04W 28/24; H04W 24/02
See application file for complete search history.

(56) References Cited

U.S. PATENT DOCUMENTS

| | | | |
|---|---|---|---|
| 9,635,000 | B1 | 4/2017 | Muftic |
| 10,009,358 | B1 | 6/2018 | Xie et al. |
| 10,542,046 | B2 | 1/2020 | Katragadda et al. |
| 10,680,800 | B2 | 6/2020 | Zhang et al. |
| 10,790,987 | B2 | 9/2020 | Zhang et al. |
| 11,005,665 | B2 | 5/2021 | Lu et al. |
| 11,080,665 | B1 | 8/2021 | Poelstra et al. |
| 11,258,590 | B1 * | 2/2022 | Tsarfati ................. H04L 9/0825 |
| 11,341,492 | B2 | 5/2022 | Ma et al. |
| 11,764,943 | B2 | 9/2023 | Honorio Araujo Da Silva et al. |
| 2006/0191010 | A1 | 8/2006 | Benjamin |
| 2009/0019170 | A1 * | 1/2009 | Wyss ...................... H04L 67/14 |
| | | | 709/229 |
| 2009/0177591 | A1 | 7/2009 | Thorpe et al. |
| 2018/0213444 | A1 * | 7/2018 | Khawand ......... H04W 28/0268 |
| 2019/0140822 | A1 | 5/2019 | Xie et al. |
| 2019/0140848 | A1 | 5/2019 | Dontov et al. |
| 2019/0199733 | A1 * | 6/2019 | Aaltonen ......... G06Q 10/06316 |
| 2019/0280880 | A1 | 9/2019 | Zhang et al. |
| 2019/0327078 | A1 | 10/2019 | Zhang et al. |
| 2021/0065113 | A1 | 3/2021 | Wynter |
| 2021/0203476 | A1 | 7/2021 | Van De Ruit et al. |
| 2022/0014513 | A1 * | 1/2022 | Neves ................. H04L 63/0846 |
| 2022/0368545 | A1 | 11/2022 | Han et al. |
| 2024/0257255 | A1 * | 8/2024 | Gupta ................... G06Q 40/06 |

* cited by examiner

_300_

EVALUATE A SET OF INFRASTRUCTURE SECURITY FOR A NETWORK-BASED
INTERACTION
302

ASSESS THE SET OF INFRASTRUCTURE SECUIRTY FOR THE NETWORK-BASED
INTERACTION
304

ENCRYPT THE NETWORK-BASED INTERACTION BASED ON THE ASSESSMENT
OF THE SET OF INFRASTRUCTURE SECURITY FOR THE NETWORK-BASED
INTERACTION
306

SYSTEM AND METHOD FOR DYNAMICALLY ENCRYPTING NETWORK-BASED INTERACTIONS BASED ON EVALUATED INFRASTRUCTURE SECURITY

TECHNOLOGICAL FIELD

Example embodiments of the present disclosure relate to dynamically encrypting network-based interactions based on evaluated infrastructure security.

BACKGROUND

Security through encryption of network-based interactions protects interactions, while increased encryption may utilize a greater amount of time and resources. The type and complexity of encryption employed may be provide different results based on the network-based interaction and associated characteristics therein.

Applicant has identified a number of deficiencies and problems associated with dynamically encrypting network-based interactions based on evaluated infrastructure security. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for dynamically encrypting network-based interactions based on evaluated infrastructure security.

In one aspect, a system for dynamically encrypting network-based interactions based on evaluated infrastructure security is provided. The system comprising: at least one non-transitory storage device; and at least one processing device coupled to the at least one non-transitory storage device, wherein the at least one processing device is configured to: evaluate a set of infrastructure security for a network-based interaction, wherein the set of infrastructure security for the network-based interaction comprises at least one node, and a layer of security protocols; assess the set of infrastructure security for the network-based interaction, wherein the set of infrastructure security is assessed on a set of predetermined criteria; and encrypt the network-based interaction based on assessment of the set of infrastructure security for the network-based interaction, wherein encryption complexity correlates to assessment of the set of infrastructure security for the network-based interaction.

In some embodiments, evaluating the set of infrastructure security for the network-based interaction is evaluated on a predetermined cycle upon initiation of the network-based interaction.

In some embodiments, evaluating the set of infrastructure security for the network-based interaction is conducted using an advanced computational model for data analysis and automated-decision making.

In some embodiments, assessment of the set of infrastructure security for the network-based interaction determines encryption types implemented in association with the network-based interaction.

In some embodiments, the at least one processing device is further configured to map encryption keys associated with performed encryption on an encryption mapper.

In some embodiments, assessment of the set of infrastructure security for the network-based interaction on the set of predetermined criteria further comprises calculating a security score.

In some embodiments, assessment of the at least one node within the set of infrastructure security comprises detecting automatic execution programs within the at least one node.

In another aspect, a computer program product for dynamically encrypting network-based interactions based on evaluated infrastructure security is provided. The computer program product comprising at least one non-transitory computer-readable medium having computer-readable program code portions embodied therein, the computer-readable code portions which when executed by a processing device are configured to cause the processor to perform the following operations: evaluate a set of infrastructure security for a network-based interaction, wherein the set of infrastructure security for the network-based interaction comprises at least one node, and a layer of security protocols; assess the set of infrastructure security for the network-based interaction, wherein the set of infrastructure security is assessed on a set of predetermined criteria; and encrypt the network-based interaction based on the assessment of the set of infrastructure security for the network-based interaction, wherein encryption complexity correlates to assessment of the set of infrastructure security for the network-based interaction.

In some embodiments, evaluating the set of infrastructure security for the network-based interaction is evaluated on a predetermined cycle upon initiation of the network-based interaction.

In some embodiments, evaluating the set of infrastructure security for the network-based interaction is conducted using an advanced computational model for data analysis and automated-decision making.

In some embodiments, assessing of the set of infrastructure security for the network-based interaction determines encryption types implemented in association with the network-based interaction.

In some embodiments, the at least one processing device is further configured to map encryption keys associated with performed encryption on an encryption mapper.

In some embodiments, assessing of the set of infrastructure security for the network-based interaction on the set of predetermined criteria further comprises calculating a security score.

In some embodiments, assessment of the at least one node within the set of infrastructure security comprises detecting automatic execution programs within the at least one node.

In another aspect, a computer-implemented method for dynamically encrypting network-based interactions based on evaluated infrastructure security. The method comprising: evaluating a set of infrastructure for a network-based interaction, wherein the set of infrastructure security for the network-based interaction comprises at least one node, and a layer of security protocols; assessing the set of infrastructure security for the network-based interaction, wherein the set of infrastructure security is assessed on a set of predetermined criteria and encrypting the network-based interaction based on the assessment of the set of infrastructure security for the network-based interaction, wherein encryption complexity correlates to assessment of the set of infrastructure security for the network-based interaction.

In some embodiments, evaluating the set of infrastructure security for the network-based interaction is evaluated on a predetermined cycle upon initiation of the network-based interaction.

In some embodiments, evaluating the set of infrastructure security for the network-based interaction is conducted using an advanced computational model for data analysis and automated-decision making.

In some embodiments, assessment of the set of infrastructure security for the network-based interaction determines encryption types implemented in association with the network-based interaction.

In some embodiments, the at least one processing device is further configured to map encryption keys associated with performed encryption on an encryption mapper.

In some embodiments, assessment of the set of infrastructure security for the network-based interaction on the set of predetermined criteria further comprises calculating a security score.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
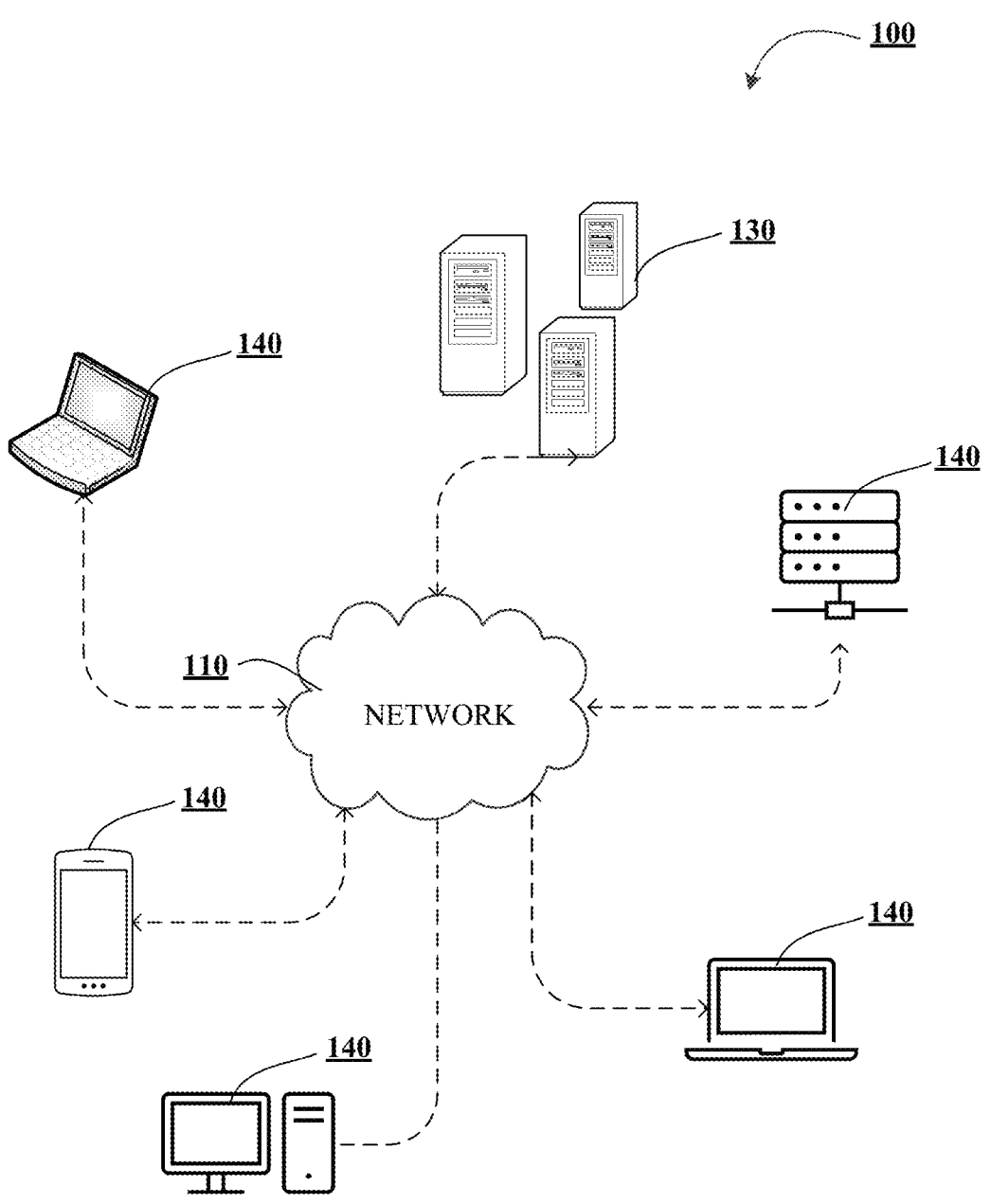
Figure 1B:
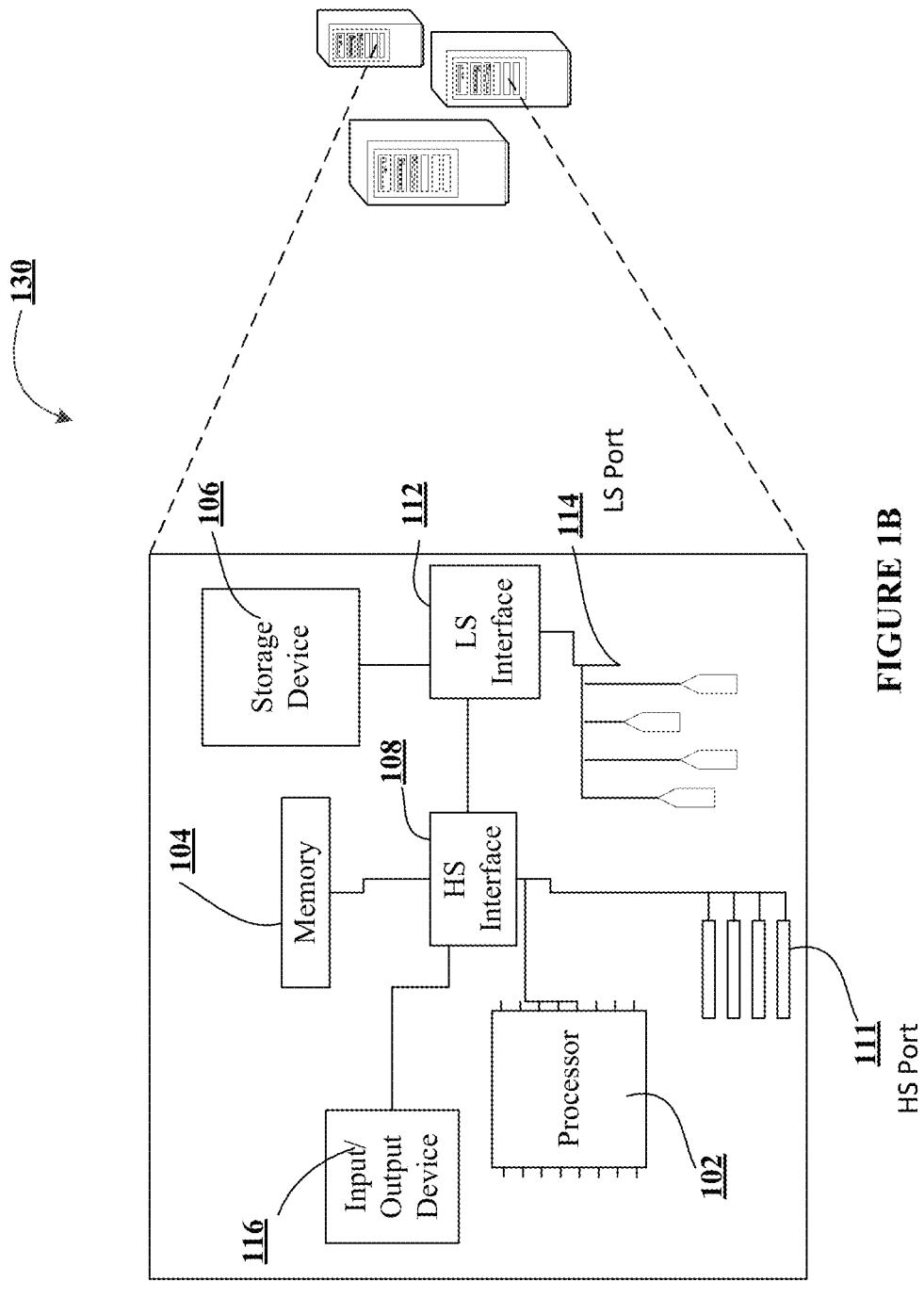
Figure 1C:
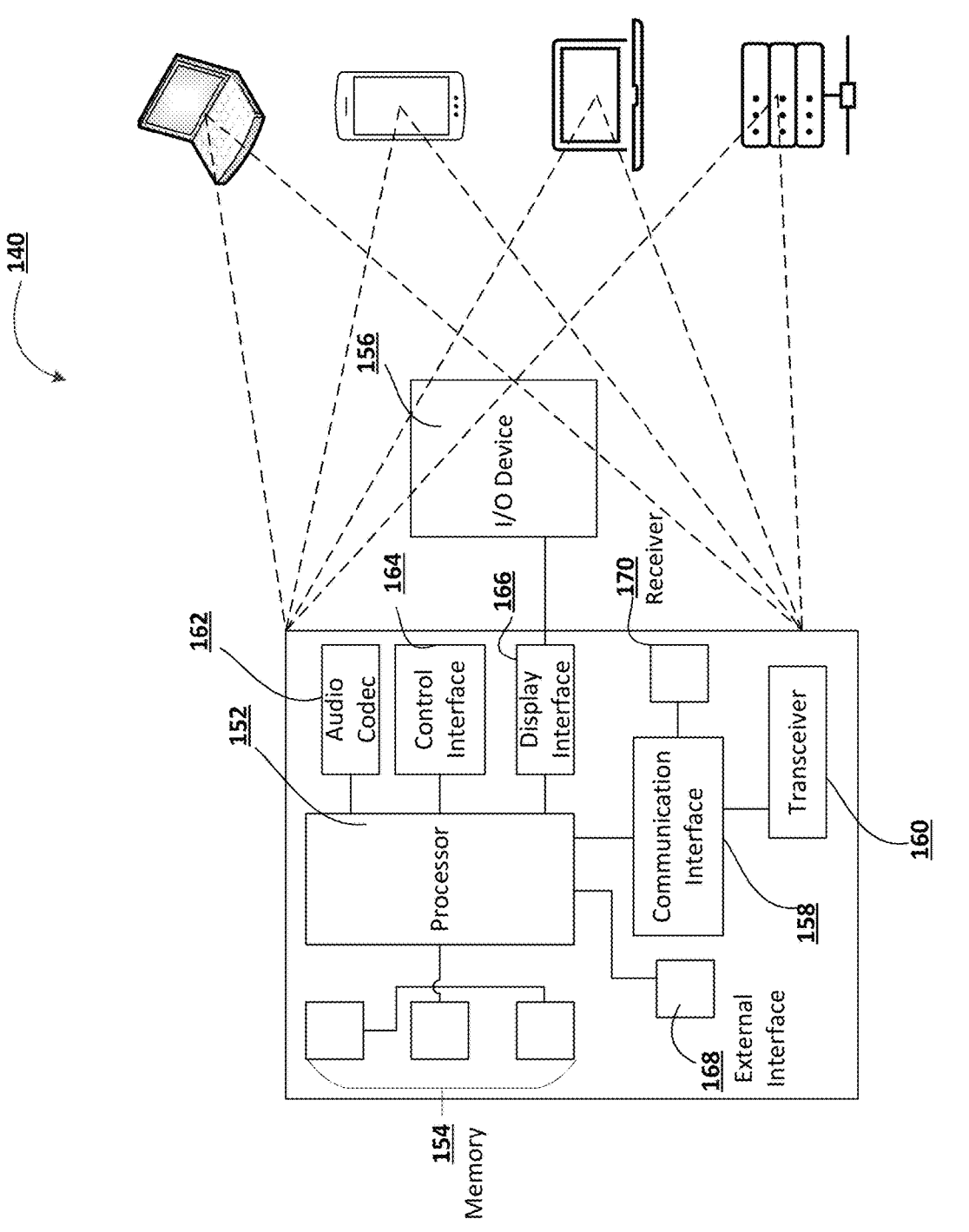
Figure 2:
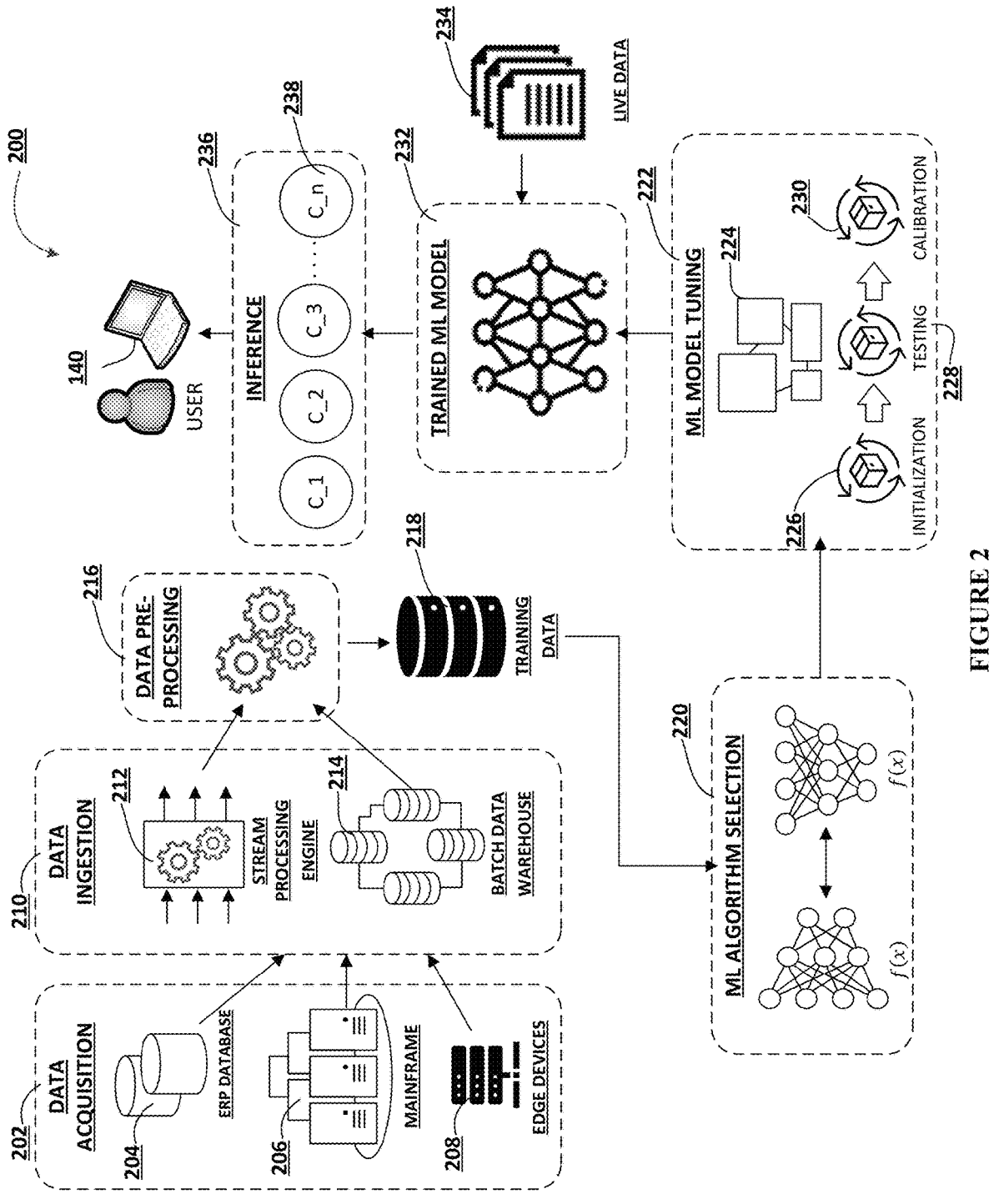
Figure 3:
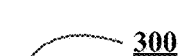
Figure 4:
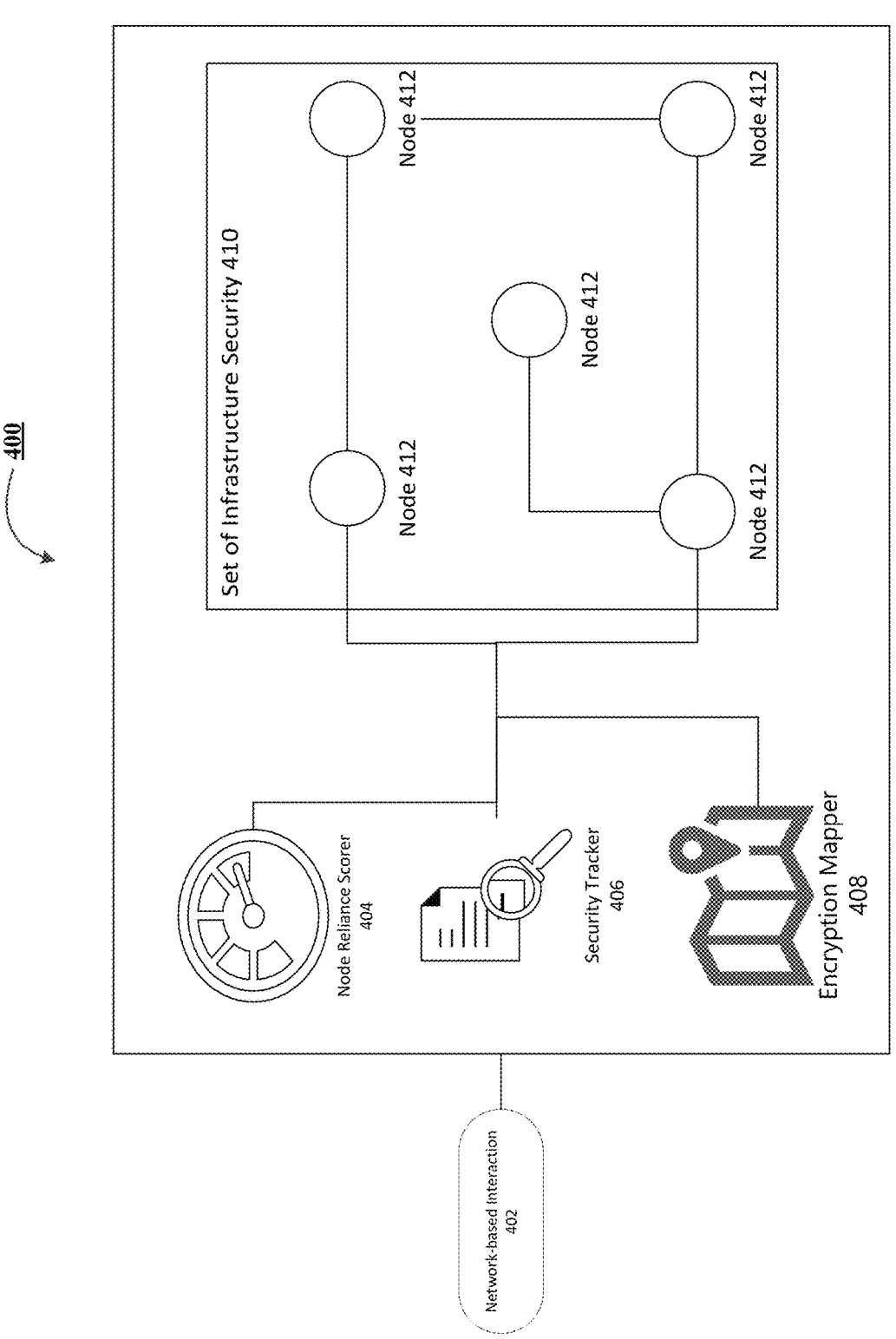

FIGS. 1A-1C illustrates technical components of an exemplary distributed computing environment for dynamically encrypting network-based interactions based on evaluated infrastructure security, in accordance with an embodiment of the disclosure;

FIG. 2 illustrates an exemplary machine learning (ML) subsystem architecture, in accordance with an embodiment of the disclosure;

FIG. 3 illustrates a process flow for dynamically encrypting network-based interactions based on evaluated infrastructure security, in accordance with an embodiment of the disclosure; and FIG. 4 illustrates an exemplary dynamic encryption architecture for network-based interactions based on associated infrastructure security, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of certified users. In some embodiments, the entity may certify the identity of the users. Furthermore, authentication information or permission may be assigned to or required from a user, application, computing node, computing cluster, or the like to access stored data within at least a portion of a system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Encryption of network-based interactions promotes security and stability of data, information, and resources within an interaction. With rising network-based attacks and evolving techniques to compromise the integrity of network-based interactions, encryption may play a growing role in preventing and deterring malicious actions to safeguard interactions. While encryption may offer increased protection, the time and resources associated with encrypting components within a network-based interaction may directly increase as additional encryption measures are implemented.

Vulnerable nodes within a block chain network may process network-based interactions but may be susceptible to malicious actions. Increased encryption may prevent said malicious actions, however significant resources and time may be spent in both the encryption and decryption process. Performing excessive security on interactions may cause obstacles prohibiting efficient distribution and resolution of interactions. Finding a balance between security and efficiency may increase the trust and capabilities of network-based interactions.

Dynamically applying encryption to a network-based interaction based on an assessment of the interaction may increase protection while limiting expended time and resources. A network-based interaction may be evaluated, assessed, and encrypted based on evaluated factors of the network-based interaction. Security and architecture associated with conducting the network-based interaction may utilize encryption to securely conduct the network-based interaction.

Accordingly, the present disclosure describes dynamically encrypting network-based interactions based on evaluated infrastructure security. Network-based interactions (i.e., resource transfers with a network-based medium of exchange) may be evaluated based on the set of infrastructure security (i.e., security, trustworthiness, and exposure of nodes associated with the interaction) to determine the type and level of encryption that may be employed to safeguard the network-based interaction. Assessment of the network-based interaction may be conducted to determine the level of encryption employed to protect the network-based interaction, wherein the complexity and level of encryption increases as the set of infrastructure security is assessed to be less secure (i.e., the set of infrastructure security comprises smart contracts/automatic execution programs, a history of attacks, unknown addresses, etc.). The set of infrastructure may be reevaluated on a cyclical basis and evaluation may be conducted using machine learning. Assessment of the set of infrastructure security may determine the type and complexity of the encryption implemented, and encryption keys associated with implemented encryption may be mapped on an encryption mapper.

What is more, the present disclosure provides a technical solution to a technical problem. As described herein, the technical problem includes dynamically encrypting network-based interaction based on evaluated infrastructure security. The technical solution presented herein allows for dynamic encryption of network-based interactions based on evaluated infrastructure security. In particular, dynamic encryption of network-based interactions based on evaluated infrastructure is an improvement over existing solutions to processing network-based interactions on untested infrastructure security (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamically encrypting network-based interactions based on evaluated infrastructure security 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2 \ldots . C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2 \ldots . C\_n$ 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for systems and methods for dynamically encrypting network-based interactions based on evaluated infrastructure security. In some embodiments, dynamically encrypting network-based interactions based on evaluated infrastructure security through systems described (e.g., similar to the one or more of the systems described herein with respect to FIGS. 1A-1C and FIG. 2) may perform one of more of the steps of process flow 300.

As shown in Block 302, the process flow 300 may include the step of evaluating a set of infrastructure security for a network-based interaction. The set of infrastructure security for the network-based interaction may be comprised of at least one node and a layer of security protocols. The network-based interaction may be an agreement, settlement, exchange, trade, and/or resource transfer between a combination of entities, individuals, groups, conglomerates, enterprises, and/or businesses. The network-based interaction may be conducted at least partially through the exchange of network-based tokens, network-based resources, network-based currencies, and/or a network-based medium of exchange. The network-based interaction may be conducted through a combination of network-based tokens (e.g., a form of a network-based resource may be exchanged for a form of another network-based resource) or the exchange of a network-based token for a separate set of goods and/or services. The network-based interaction may be comprised of a set of infrastructure security within/associated with the network-based interaction. The set of infrastructure security for the network-based interaction may include but may not be limited to at least one node, at least one layer of security protocols, devices associated with the network-based interaction (e.g., databases, hardware, internet connected devices) and virtual addresses associated with the network-based interaction. The layer of security protocols may be comprised of the measures, policies, procedures, rules, and/or implemented security protocols enacted in preparation of and/or during a network-based interaction. The layer of security protocols may further comprise layers between nodes within the set of infrastructure security. For instance, a network layer between a first node and a second node within the at least one node may be evaluated for potential vulnerabilities/security protocols that may prevent modification of the network-based interaction.

Evaluation of the set of infrastructure security for the network-based interaction may determine, score, and/or grade the set of infrastructure security based on predetermined criteria. The set of infrastructure may be evaluated to determine the level of security associated with network-based interactions when in comparison to the predetermined criteria used to evaluate the security in which network-based interactions may be conducted. The set of infrastructure may be evaluated through examination of the set of infrastructure security associated with the network-based interaction.

In some embodiments, a network-based interaction may be a resource transfer as described previously. The resource transfer embodiment of the network-based interaction may comprise transferring a network-based medium of exchange within a network. For instance, the network-based interaction may be conducted at least partially with a decentralized network based on blockchain technology. The network-based interaction may be recorded on a distributed ledger record, that may record the network-based interaction across a network of computers or set of infrastructure associated with processing said network-based interactions.

In some embodiments, evaluation of the set of infrastructure security may be implemented on a predetermined cycle, or cyclical basis upon initiation of the network-based interaction. For instance, the set of infrastructure security may be revaluated on a given frequency (i.e., the infrastructure is evaluated once every minute). The evaluation of the set of infrastructure security may be conducted cyclically, conducted after a triggering action is detected (i.e., the infrastructure security associated with the network-based interaction is changed), and/or on an as requested basis (i.e., an individual/group/entity associated with the network-based interaction requests the revaluation of the infrastructure security). The set of infrastructure security may be reevaluated upon addition or removal of a node from the at least one node within the set of infrastructure security. Reevaluation may be triggered with the modification of items, policies, and/or procedures within the set of infrastructure security. Evaluation of the set of infrastructure security may be evaluated on the predetermined cycle while the network-based interaction is conducted and/or conclusion of the network-based interaction (i.e., reevaluation may occur at regular predetermined intervals while the network-based interaction is conducted). In another embodiment, reevaluation may occur at predetermined points within the network-based interaction (i.e., initially at the start of the network-based interaction and again before conclusion of the network-based interaction).

In some embodiments, the set of infrastructure security may be further comprised of nodes associated with the network-based interaction, policies associated with the network-based interaction, hardware associated with the network-based interaction, smart contracts associated with the network-based interaction, and third parties associated with conducting the network-based interaction. The set of infrastructure security may be updated periodically through cyclical evaluation, as described previously.

As shown in Block 304, the process flow 300 may include the step of assessing the set of infrastructure security for the network-based interaction. Assessment of the set of infrastructure security may be comprised of assignment of a security score (i.e., "a grade" or a "security score" associated with the network-based interaction) which may indicate the security of the set of infrastructure security associated with the network-based interaction. For instance, a network-based interaction may be comprised of a plurality of smart contracts that may be more vulnerable to third party attacks or comprise automatic execution programs/smart contracts within the at least one node. The assessment may determine the level, extent, and/or capabilities of the set of infrastructure security associated with the network-based interaction. The assessment of the infrastructure may be conducted through grading the set of infrastructure security associated with the network-based interaction. Grading the set of infrastructure security may determine the level of security associated with the network-based interaction. For instance, a network-based interaction may be assessed as secure and be ranked into a secure interaction category. Conversely, a network-based interaction with infrastructure security that is comprised of predetermined factors indicating unsecured interactions may be designated as an unsecured interaction. In another instance, the security of a network-based interaction may be calculated, with predetermined factors associated with the network-based interaction being used to calculate the score of the network-based interaction.

In some embodiments, assessment of the set of infrastructure security for the network-based interaction may correlate to a level of encryption implemented. Assessment of the set of infrastructure security may designate aspects of the network-based interactions into grades, scores, or categories dictating the reliability, security, vulnerability, and comparative trust of the set of infrastructure security. The assessment may categorize the set of infrastructure security for the network-based interaction to designate the type and complexity of the encryption methods used in association with the network-based interaction.

In some embodiments, the security score calculated during assessment of the set of infrastructure security for the network-based interaction may indicate the type and level of encryption implemented. For instance, the number of automatic execution programs within the at least one node and the quality of layer of security protocols may be weighted within a predetermined equation to calculate the security score associated with the set of infrastructure security. The security score may be used to determine the type and level of encryption implemented on the network-based interaction. In some embodiments, assessment of the set of infrastructure security for the network-based interaction may determine encryption types implemented in association with the network-based interaction. In other words, assessment of the network-based interaction, the security score associated with the network-based interaction, and the set of infrastructure security for the network-based interaction may indicate the type and/or complexity of the encryption implemented.

As shown in Block 306, the process flow 300 may include the step of encrypting the network-based interaction based on the assessment of the set of infrastructure security for the network-based interaction. Encryption of the network-based interaction may be conducted based on the assessment of the set of infrastructure security associated with the network-based interaction, with encryption complexity correlating to the conducted assessment. For instance, a network-based interaction with a set of infrastructure security assessed to be "strong", "secure", and/or comprise vulnerabilities below a predetermined threshold/limit may be subjected to comparatively less encryption than a network-based interaction with a set of infrastructure security assessed to be "weak", "unsecure", and/or comprise a plurality of vulnerabilities. The assessment of the network-based interaction may be used to dynamically determine the level of encryption the network-based interaction may be subjected to. The level of encryption employed on the network-based interaction may enable secure processing of the network-based interaction through unsecured infrastructure (i.e., smart contracts/automatic execution programs, third party nodes within the network-based interaction, vulnerable communication layers, etc.). Encryption of the network-based interaction may comprise at least partial encryption of the network-based interaction and/or encryption of components within the network-based interaction.

In some embodiments, the level of encryption employed on the network-based interaction may be comprised of at least partial homomorphic encryption based on the assessment of the set of infrastructure security associated with the network-based interaction. The complexity and level of homomorphic encryption employed may be determined from the previously conducted assessment. For instance, the detection of an automatic execution program/smart contract within the set of infrastructure security with nodes assessed to be untrustworthy may cause the network-based interaction to be subjected to a full homomorphic encryption. In another example, a network-based interaction with smart contracts and trustworthy nodes may be assessed to have a partial homomorphic encryption. A partial homomorphic encryption may be performed based on the level of untrustworthiness of the nodes associated with the network-based interaction (i.e., the greater the number of untrustworthy nodes, the closer the partial homomorphic encryption may approach a full homomorphic encryption) and/or a security score indicating a recommended encryption level. In another example, a network-based interaction with nodes assessed to be trustworthy and criteria designating the network-based interaction as secure, the network-based interaction may be subjected to a predetermined lower bound of encryption procedures (i.e., no implanted encryption or a comparatively low complexity encryption). The complexity and level of encryption employed may be predetermined based on the assessment of the set of infrastructure security employed. For instance, more complex encryption forms may be employed for a network-based interaction in which at least one automatic execution program (i.e., smart contract) is present. Detection of an automatic execution program within the set of infrastructure security associated with the set of nodes may indicate vulnerability within the network-based interaction. As the number of detected automatic execution programs increases, the complexity and strength of the encryption employed may increase.

In some embodiments, the set of infrastructure security may be evaluated on a cyclical basis. For instance, the set of infrastructure security may be evaluated on a predetermined cycle wherein the set of infrastructure security for the network-based interaction is evaluated repeatedly (i.e., a set of infrastructure security may be evaluated every second/minute/hour). In another instance, the set of infrastructure security may be partially assessed after an initial assessment. The partial assessment may review aspects of the network-based interaction that may change at a greater frequency than other aspects of the interaction. For instance, the nodes in which the network-based interaction may be conducted may be assessed periodically while the hardware on which the network-based interaction is conducted may be assessed initially while remaining unassessed with subsequent assessments.

In some embodiments, evaluation of the set of infrastructure security may be conducted by advanced computational model for data analysis and automated decision making. The advanced computational model for data analysis and automated decision making may be a machine learning model, as demonstrated in FIG. 2. The advanced computational model for data analysis and automated decision making may be a form of machine learning utilized to analyze, grade, evaluate, or assess the set of infrastructure security as described herein. Use of machine learning to determine levels of encryption of the network-based interaction may enable a dynamic level of encryption to be applied to the network-based interaction. Machine learning subsystem architecture 200 as described in FIG. 2, may be implemented to perform the assessment of the set of infrastructure security from a predetermined grade, or assign a form of a security score (ranging from no additional encryption measures to implementing full encryption measures). For instance, a network-based interaction may be analyzed for vulnerabilities and indicators that additional encryption measures may be implemented based on the security score.

In some embodiments, the encryption of the network-based interaction may be recorded using an encryption mapper to record the type and extent of encryption performed on the network-based interaction. For instance, the partial homomorphic encryption performed on a network-based interaction may be recorded by the encryption mapper, which may provide a map, recording, record, legend, or key associated with the encryption performed regarding the network-based interaction. The forms of encryption recorded by the encryption mapper may include but may not be limited to symmetric encryption, asymmetric encryption, hash functions, hash-based message authentication code, digital signatures, homomorphic encryption, and partial homomorphic encryption. Records of the encryption used in association with the network-based interaction may be distributed after conclusion of the network-based interaction. Access to mapped encryption keys may include but may not be limited to associates participating in the network-based interaction, predetermined individuals, groups, and/or entities. The encryption mapper may enable cracking of the encryption implemented in association with the network-based interaction.

Turning now to FIG. 4, an exemplary architecture of a dynamic encryption based on infrastructure security 400 is provided. A network-based interaction 402 may be assessed by a node reliance scorer 404. The node reliance scorer 404 may score the nodes associated with the network-based interaction 402 on predetermined factors that may include the presence of smart contracts associated with a given node, plain communication layer, history of the given node, and/or characteristics of the node. The node reliance scorer 404 may be used to detect, trace, record, and/or monitor the reliability of nodes associated with the network-based interaction 402. Monitoring the reliability of nodes associated with the interaction may be a recurring process. For instance, nodes associated with the network-based interaction 402 may be assessed on the reliability before the network-based interaction is completed/while the network-based interaction is being conducted.

The security tracker 406 may add, subtract, monitor, and/or adjust the set of infrastructure security scored by the node reliance scorer 404. The security tracker may comprise a form of machine learning as described in FIG. 2 to update the components of the set of infrastructure security which may evaluated by the node reliance scorer 404. Updates to the set of infrastructure security monitored by the security tracker 406 may be initiated at the commencement of a network-based interaction 402 and may be evaluated on a cyclical basis throughout the network-based interaction.

The encryption mapper 408 may record, document, and/or track the encryption conducted in association with the network-based interaction 402. Encryption implemented in association with the network-based interaction 402 may be mapped within the encryption mapper 408, which may be configured to be accessed upon conclusion of the network-based interaction. The encryption mapper 408 may map encryption types and keys for future access and cracking the employed encryption.

The network-based interaction 402 may be processed through the set of infrastructure security 410 while the set of infrastructure security is monitored by the node reliance scorer 404, the security tracker 406, and the encryption mapper 408. The infrastructure security 410 may comprise at least one node 412 and a layer of security protocols, as described previously. The security tracker 406 may evaluate the set of infrastructure security 410, the node reliance scorer 404 may assess the set of infrastructure security, and the encryption mapper 408 may map the implemented encryption performed on the network-based interaction.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamically encrypting network-based interactions based on evaluated infrastructure security, the system comprising:

at least one non-transitory storage device; and at least one processing device coupled to the at least one non-transitory storage device, wherein the at least one processing device is configured to:

evaluate a set of infrastructure security for a network-based interaction, wherein the set of infrastructure security for the network-based interaction comprises at least one node, and a layer of security protocols;

assess the set of infrastructure security for the network-based interaction, wherein the set of infrastructure security is assessed on a set of predetermined criteria comprising number of smart contracts, third party nodes, and vulnerable communication layers within the network-based interaction; and encrypt the network-based interaction based on assessment of the set of infrastructure security for the network-based interaction, wherein encryption complexity is dynamically adjusted to correlate with assessment of the set of infrastructure security for the network-based interaction.

2. The system of claim 1, wherein evaluating the set of infrastructure security for the network-based interaction is evaluated on a predetermined cycle upon initiation of the network-based interaction.

3. The system of claim 1, wherein evaluating the set of infrastructure security for the network-based interaction is conducted using an advanced computational model for data analysis and automated-decision making.

4. The system of claim 1, wherein the at least one processing device is further configured to map encryption keys associated with performed encryption on an encryption mapper.

5. The system of claim 1, wherein assessment of the set of infrastructure security for the network-based interaction on the set of predetermined criteria further comprises calculating a security score.

6. The system of claim 1, wherein assessment of the at least one node within the set of infrastructure security comprises detecting automatic execution programs within the at least one node.

7. A computer-program product for dynamically encrypting network-based interactions based on evaluated infrastructure security, the computer program product comprising at least one non-transitory computer-readable medium having computer-readable program code portions embodied therein, the computer-readable program code portions which when executed by a processing device are configured to cause the processor to perform the following operations:

evaluate a set of infrastructure security for a network-based interaction, wherein the set of infrastructure security for the network-based interaction comprises at least one node, and a layer of security protocols;

assess the set of infrastructure security for the network-based interaction, wherein the set of infrastructure security is assessed on a set of predetermined criteria comprising number of smart contracts, third party nodes, and vulnerable communication layers within the network-based interaction; and encrypt the network-based interaction based on the assessment of the set of infrastructure security for the network-based interaction, wherein encryption complexity is dynamically adjusted to correlate with assessment of the set of infrastructure security for the network-based interaction.

8. The computer-program product of claim 7, wherein evaluating the set of infrastructure security for the network-based interaction is evaluated on a predetermined cycle upon initiation of the network-based interaction.

9. The computer-program product of claim 7, wherein evaluating the set of infrastructure security for the network-based interaction is conducted using an advanced computational model for data analysis and automated-decision making.

10. The computer-program product of claim 7, wherein the processor is further configured to map encryption keys associated with performed encryption on an encryption mapper.

11. The computer-program product of claim 7, wherein assessment of the set of infrastructure security on the set of predetermined criteria further comprises calculating a security score.

12. The computer-program product of claim 7, wherein assessment of the at least one node within the set of infrastructure security comprises detecting automatic execution programs with the at least one node.

13. A computer-implemented method for dynamically encrypting network-based interactions based on evaluated infrastructure security, the method comprising:

evaluating a set of infrastructure security for a network-based interaction, wherein the set of infrastructure security for the network-based interaction comprises at least one node, and a layer of security protocols;

assessing the set of infrastructure security for the network-based interaction, wherein the set of infrastructure security is assessed on a set of predetermined criteria comprising number of smart contracts, third party nodes, and vulnerable communication layers within the network-based interaction; and encrypting the network-based interaction based on the assessment of the set of infrastructure security for the network-based interaction, wherein encryption complexity is dynamically adjusted to correlate with assessment of the set of infrastructure security for the network-based interaction.

14. The computer-implemented method of claim 13, wherein evaluating the set of infrastructure security for the network-based interaction is evaluated on a predetermined cycle upon initiation of the network-based interaction.

15. The computer-implemented method of claim 13, wherein evaluating the set of infrastructure security for the network-based interaction is conducted using an advanced computational model for data analysis and automated-decision making.

16. The computer-implemented method of claim 13, wherein the computer-implemented method further comprises mapping encryption keys associated with performed encryption on an encryption mapper.

17. The computer-implemented method of claim 13, wherein assessing the set of infrastructure security for the network-based interaction on the set of predetermined criteria further comprises calculating a security score.

* * * * *